(12) United States Patent
Hong et al.

(10) Patent No.: US 11,469,478 B2
(45) Date of Patent: Oct. 11, 2022

(54) CONNECTOR FOR BATTERY BOX OF ELECTRIC VEHICLE AND BATTERY BOX, ELECTRIC VEHICLE THEREOF

(71) Applicant: HEFEI UNIVERSITY OF TECHNOLOGY, Hefei (CN)

(72) Inventors: Zhanyong Hong, Hefei (CN); Chengxu Hao, Hefei (CN); Haotian Hong, Hefei (CN); Rui Wang, Hefei (CN); Shulin Zheng, Hefei (CN); Hua Zhai, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 405 days.

(21) Appl. No.: 16/876,101

(22) Filed: May 17, 2020

(65) Prior Publication Data
US 2020/0373543 A1    Nov. 26, 2020

(30) Foreign Application Priority Data

May 21, 2019   (CN) .......................... 201910421555.6

(51) Int. Cl.
*H01M 50/528*    (2021.01)
*H01M 50/20*    (2021.01)

(52) U.S. Cl.
CPC ......... *H01M 50/528* (2021.01); *H01M 50/20* (2021.01); *H01M 2220/20* (2013.01)

(58) Field of Classification Search
None
See application file for complete search history.

(56) References Cited

U.S. PATENT DOCUMENTS 6,030,722 A * 2/2000 Kuboshima .......... H01R 11/282
                                                         439/352

* cited by examiner

*Primary Examiner* — Wyatt P McConnell
(74) *Attorney, Agent, or Firm* — Hemisphere Law, PLLC; Zhigang Ma

(57) ABSTRACT

A connector includes a male connector, a female connector and a rotating clamping structure. The male connector includes a first housing with multiple channels, the female connector includes a second housing with at least one positioning slot. The rotating clamping structure includes a third housing, multiple first positioning pins, multiple stoppers and multiple second positioning pins. The rotating clamping structure can realize the locking or separation of the male connector and the female connector.

20 Claims, 7 Drawing Sheets

CONNECTOR FOR BATTERY BOX OF ELECTRIC VEHICLE AND BATTERY BOX, ELECTRIC VEHICLE THEREOF

FIELD OF THE INVENTION

The present invention relates to technical field of electric vehicles, and more particularly to a connector for battery box of electric vehicle and a battery box, an electric vehicle thereof.

BACKGROUND OF THE INVENTION

With the rapid development of new energy vehicles, the requirements for the electrical system of the whole vehicle are higher and higher. The old connectors and harnesses no longer meet the needs of people today for high voltage, high current, water resistance, lightness and other safety and reliability.

The connection between the male connector and the female connector of the existing connector is unstable, and it is easy to cause the male connector and the female connector to fall off each of other, thereby affecting the connection quality and causing huge troubles and economic losses to enterprises and users. Before the installation of the existing connector, the male connector and the female connector must be adjusted to the corresponding position to be fixed, and the male connector and the female connector cannot be fixed at any position. Moreover, the existing connector shell is made of metal alloy, which is heavy and difficult to install and operate.

SUMMARY OF THE INVENTION

Therefore, the object of the present invention is to provide a connector for battery box of electric vehicle, it can lock the connection part, make the connection between the male connector and the female connector more stable, and can fix the male connector and the female connector at any position, which is convenient and practical.

The another object of the present invention provides battery box, which includes the connector, and the connector is convenient and practical.

The further object of the present invention provides an electric vehicle, the electric vehicle includes the battery box, and the battery box includes the connector which is convenient and practical.

The present invention provides a connector for battery box of electric vehicle, including:

a male connector, including a first housing; multiple channels being defined in the first housing and arranged coaxial;

a female connector, including a second housing; at least one positioning slot being defined in the second housing; and a rotating clamping structure, including a third housing, multiple first positioning pins, multiple stoppers and multiple second positioning pins; one end of each of the stoppers being a sharp angle end and the other end being an arc end; the sharp angle end being rotated to the third housing through one of the first positioning pins; the first positioning pins and the second positioning pins having the same axial direction;

wherein, the male connector is adapted to the female connector, and the third housing covers the connection of the first housing and the second housing; the positioning slot and the channels are connected in the same radial direction; the channels, the first positioning pins, the stoppers and the second positioning pins correspond one by one; a chute is defined in each of the stoppers, and each of the second positioning pins can glide in the corresponding chute and is fixed in the corresponding channel; when the third housing rotates in one direction, the arc end can be screwed into the corresponding channel and then stuck into the positioning slot, so as to realize the locking of the male connector and the female connector; when the third housing rotates in another direction, the arc end can be screwed out of the corresponding channel and the positioning slot, so as to realize the separation of the male connector and the female connector.

In the connector of the present invention, the connector further includes two waterproof structures; each of the waterproof structure includes at least two tabs and a positioning sleeve positioned by the tabs; the tabs are circularly defined at the outer edge of the tail of the male connector or the outer edge of the tail of the female connector.

In the connector of the present invention, the tabs are inclined towards the tail direction and folded to form a hook part, and the vertical section of the hook part is a right-angle trapezoid.

In the connector of the present invention, at least two clamping grooves are defined on the peripheral side of the positioning sleeve, and at least two first openings are defined on the side wall of the positioning sleeve; the tabs are located in the clamping grooves though the first openings.

In the connector of the present invention, a first insert cavity shell are defined in the end of the first housing which connects to the second housing, and the channels are defined in the first insert cavity shell.

In the connector of the present invention, the positioning slot is substantially arcuate.

In the connector of the present invention, each of the stoppers is cam shaped as a whole.

In the connector of the present invention, a plug-in slot is defined in the end of the first housing close to the second housing; a first wiring slot is defined in the end of the first housing far away from the plug-in slot; a first through slot is defined in the first housing between the plug-in slot and the first wiring slot.

In the connector of the present invention, the male connector further includes a ferrule; the ferrule is horizontally inserted and fixed in the first through slot, and the two ends of the ferrule extend horizontally to the plug-in slot and the first wiring slot respectively.

In the connector of the present invention, a second insert cavity shell is defined in the end of the first housing which connects to the second housing, and the outer diameter of second insert cavity is less than the inner diameter of the first insert cavity shell; the second insert cavity shell is defined in the plug-in slot outside the ferrule, and the end of the second insert cavity shell far from the first through slot extends horizontally to the outside of the plug-in slot.

In the connector of the present invention, the male connector further includes a fixing sleeve; the fixing sleeve is threaded to a side area of the first insert cavity shell away from the plug-in slot, and the fixing sleeve is able to be closely connected with the rotating clamping structure.

In the connector of the present invention, a ferrule groove is defined on the wall of the end of the first housing in the plug-in slot; a plastic insulating head is defined on the end of the ferrule in the plug-in slot; a first crimping groove is defined in the end of the ferrule in the first wiring slot.

In the connector of the present invention, a second through slot is defined in the end of the second housing, and a second wiring slot is defined in the other end of the second housing.

In the connector of the present invention, the female connector further includes an inserting sleeve; the inserting sleeve is horizontally inserted and fixed in the second through slot, and the end of the inserting sleeve close to the second wiring slot extends horizontally into the second wiring slot; a shell groove is defined in the second housing, and the shell groove is located outside the second through slot and coaxial.

In the connector of the present invention, at least two bumps are defined in the inside wall of the inserting sleeve; the end of the inserting sleeve close to the second wiring slot extends horizontally into the second wiring slot, and a second crimping groove is defined in the end of the inserting sleeve in the second wiring slot.

In the connector of the present invention, the third housing including a first annular portion; one side of the annular portion turning to the form a second annular portion, and the end of the first positioning pins are inserted and fixed on the second annular portion.

In the connector of the present invention, a second opening is defined in the side of the positioning sleeve.

In the connector of the present invention, each of the waterproof structures further includes an expansion rubber plug; the expansion rubber plug is accommodated in the cavity of the first wiring slot.

The present invention also provides a battery box, including at least one connector; the connector including:

a male connector including a first housing; multiple channels being defined in the first housing and arranged coaxial;

a female connector including a second housing;

at least one positioning slot being defined in the second housing; and a rotating clamping structure, including a third housing, multiple first positioning pins, multiple stoppers and multiple second positioning pins; one end of each of the stoppers being a sharp angle end and the other end being an arc end; the sharp angle end being rotated to the third housing through one of the first positioning pins; the first positioning pins and the second positioning pins having the same axial direction;

wherein, the male connector is adapted to the female connector, and the third housing covers the connection of the first housing and the second housing; the positioning slot and the channels are connected in the same radial direction; the channels, the first positioning pins, the stoppers and the second positioning pins correspond one by one; a chute is defined in each of the stoppers, and each of the second positioning pins can glide in the corresponding chute and is fixed in the corresponding channel; when the third housing rotates in one direction, the arc end can be screwed into the corresponding channel and then stuck into the positioning slot, so as to realize the locking of the male connector and the female connector; when the third housing rotates in another direction, the arc end can be screwed out of the corresponding channel and the positioning slot, so as to realize the separation of the male connector and the female connector.

The present invention further provides an electric vehicle, the battery box of the electric vehicle including at least one connector; the connector including:

a male connector including a first housing; multiple channels being defined in the first housing and arranged coaxial;

a female connector including a second housing;

at least one positioning slot being defined in the second housing; and a rotating clamping structure, including a third housing, multiple first positioning pins, multiple stoppers and multiple second positioning pins; one end of each of the stoppers being a sharp angle end and the other end being an arc end; the sharp angle end being rotated to the third housing through one of the first positioning pins; the first positioning pins and the second positioning pins having the same axial direction;

wherein, the male connector is adapted to the female connector, and the third housing covers the connection of the first housing and the second housing; the positioning slot and the channels are connected in the same radial direction; the channels, the first positioning pins, the stoppers and the second positioning pins correspond one by one; a chute is defined in each of the stoppers, and each of the second positioning pins can glide in the corresponding chute and is fixed in the corresponding channel; when the third housing rotates in one direction, the arc end can be screwed into the corresponding channel and then stuck into the positioning slot, so as to realize the locking of the male connector and the female connector; when the third housing rotates in another direction, the arc end can be screwed out of the corresponding channel and the positioning slot, so as to realize the separation of the male connector and the female connector.

Solution of the present invention, for solving the above problem, is that apply the above connector for battery box of electric vehicle which is convenient and practical. The male connector and the female connector of the connector can be fast locked or separated by the rotating clamping structure, making the connection of the connector more stable, and the rotating clamping structure can be fixed at any position of the connector. Specifically, the sharp angle end can rotate around the axial direction of the first positioning pin to make the arc end screw into or out of the positioning slot, so as to realize the locking or separation of the male connector and the female connector. During the positioning process, the male connector and the female connector will never fall off each of other, and can be installed and positioned at any position. This is very labor-saving and the operation is relatively simple. The connector can meet the working requirements of the battery box of the electric vehicle under various environmental conditions, and ensure the continuous power supply of the battery in the battery box, which is safe and reliable.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Figure 1:
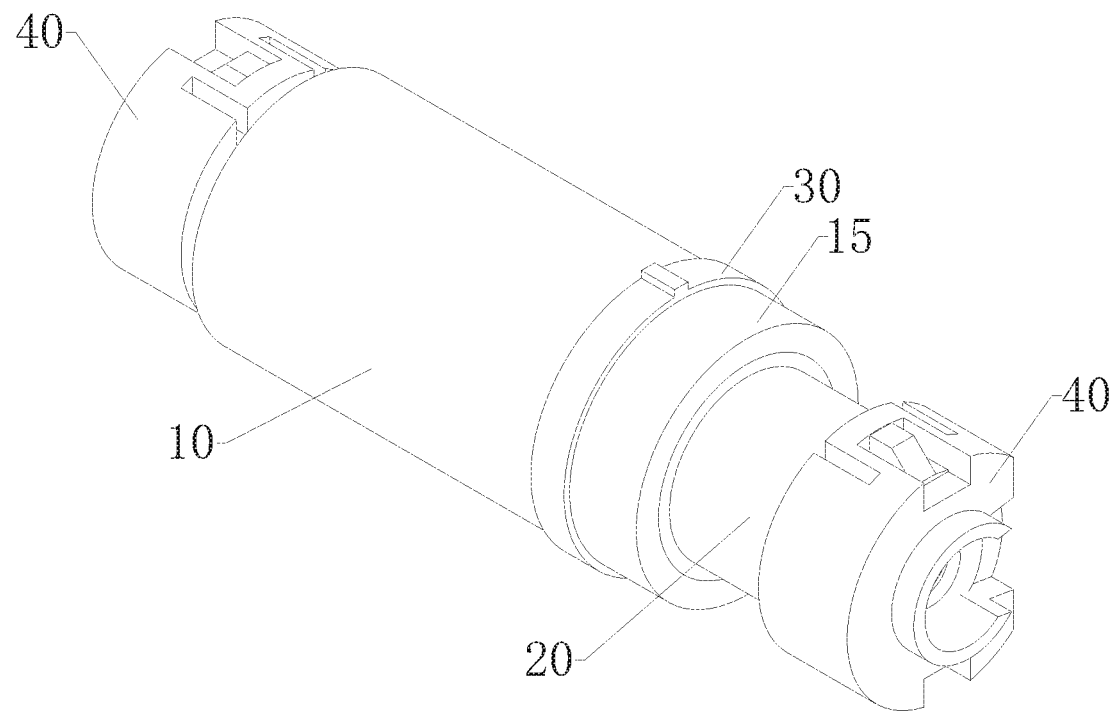
FIG. 1 is a diagram of the structure of the connector for battery box of electric vehicle, according to the first embodiment.

Referring to FIG. 1, a connector for battery box of electric vehicle is shown as an embodiment. The connector includes a male connector 10, a female connector 20, a rotating clamping structure 30 and two waterproof structures 40.

Figure 2:
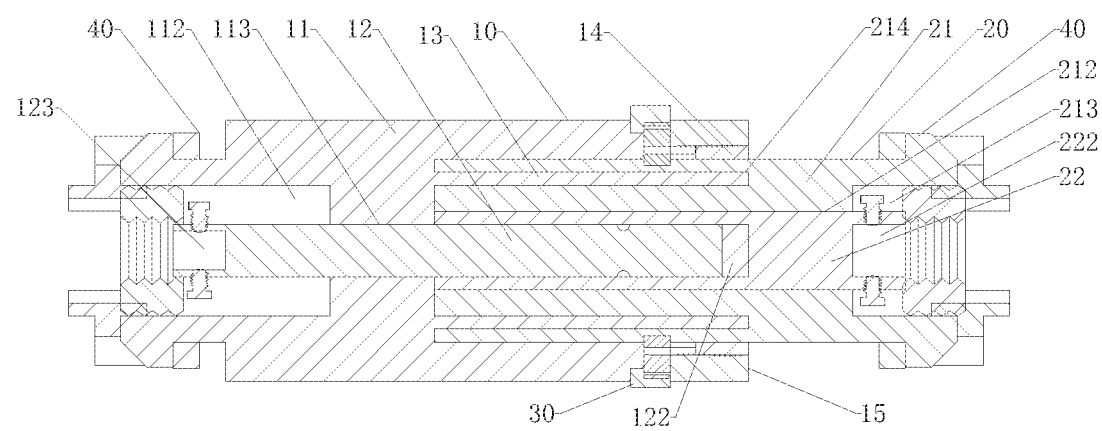
FIG. 2 is a general assembly profile diagram of the male connector and the female connector of the connector for battery box of electric vehicle of FIG. 1.
Figure 3:
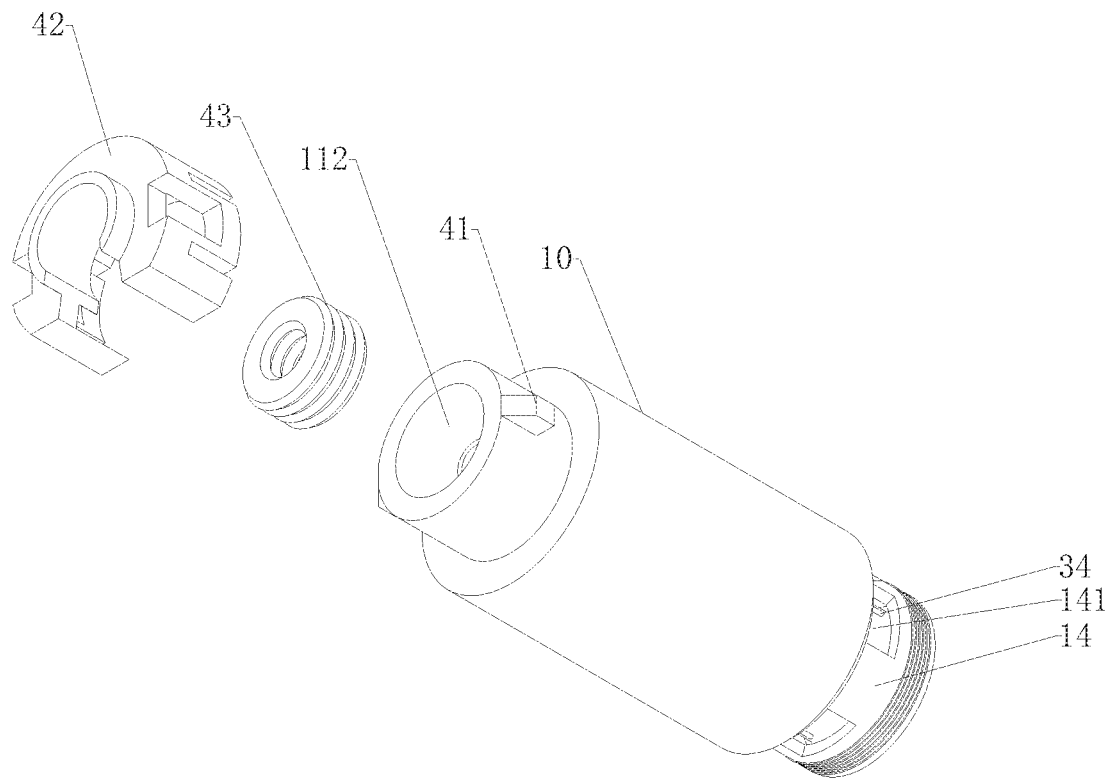
FIG. 3 is a local assembly stereo split diagram of the male connector of the connector for battery box of electric vehicle of FIG. 1.
Figure 4:
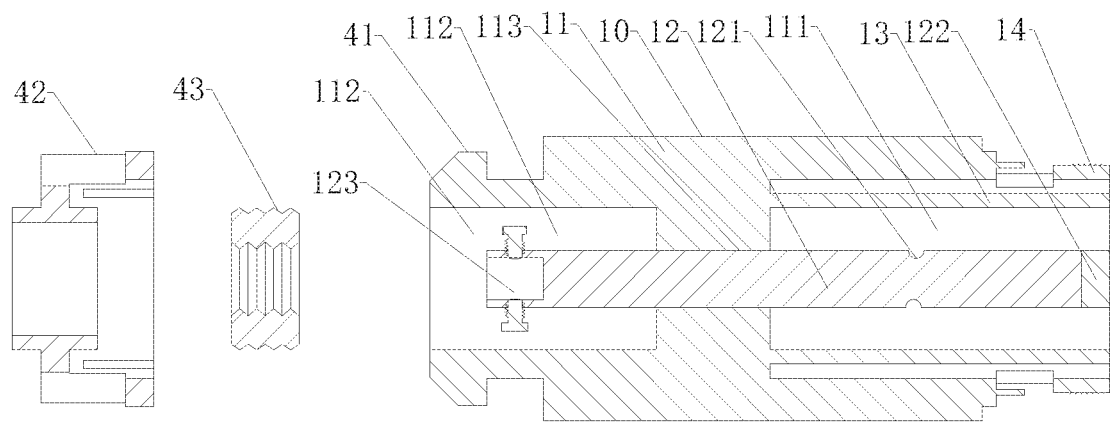
FIG. 4 is a partial assembly profile split diagram of the male connector of FIG. 3.

Referring to FIGS. 2, 3 and 4, the male connector 10 includes a first housing 11, a ferrule 12 and a fixing sleeve 15.

In this embodiment, the first housing 11 is a cylindrical shell with a rectangular cross-section, and in other embodiments, the first housing 11 can also be a column shaped shell with a different cross-section, as long as it does not affect the stability of its structure, it can also be another shell structure. The first housing 11 is made of thermoplastic engineering plastics, which can reduce the accident of electric leakage, reduce the weight of the body, and save the electric energy of the vehicle.

Multiple channels 141 are defined in the first housing 11 and arranged coaxial, the distances between all adjacent channels 141 are the same. A first insert cavity shell 14 is defined in the end of the first housing 11 which connects to the second housing 21, and the channels 141 are defined in the first insert cavity shell 14. The first insert cavity shell 14 is a cylinder shaped cylinder with a hollow center, and in other embodiments, it can be a long cylinder shaped cylinder with a rectangle as a whole, as long as it does not affect the socket fit between it and the second housing 21, it can also be another shell structure. The first insert cavity shell 14 is concentrically arranged in the plug-in slot 111 outside the ferrule 12, and the end of first insert cavity shell 14 far away the first through slot 113 extends horizontally to the outer side of the notch of the plug-in slot 111.

The first housing 11 is connected to the second housing 21. A second insert cavity shell 13 is defined in the end of the first housing 11. The outer diameter of second insert cavity is less than the inner diameter of the first insert cavity shell 14. The second insert cavity shell 13 is a cylinder shaped with a hollow center. In other embodiments, it can be a long cylinder shaped with a rectangle as a whole, as long as it does not affect the thread fit between it and the second housing 21, it can also be another shell structure. The part of the second insert cavity shell 13 arranged outside the plug-in slot 111 can be divided into a rotating clamping area and a threaded connecting area. The second insert cavity shell 13 is concentrically fixed on the outside of the slot of the plug-in slot 111. The second insert cavity shell 13 is sleeved on the inside of the first insert cavity shell 14, and the second insert cavity shell 13 and the other parts of the first housing 11 on the outside of the plug-in slot 111 are integrally welded. The area near one side of the plug-in slot 111 of the second insert cavity shell 13 is rotationally clamped with the third housing 31.

A plug-in slot 111 is defined in the end of the first housing 11 close to the second housing 21, and the plug-in slot 111 is in the second insert cavity shell 13. A first wiring slot 112 is defined in the end of the first housing 11 far away from the plug-in slot 111. A first through slot 113 is defined in the first housing 11 between the plug-in slot 111 and the first wiring slot 112. the first through slot 113, the plug-in slot 111 and the first wiring slot 112 are coaxial.

The ferrule 12 is horizontally inserted and fixed in the first through slot 113, and the two ends of the ferrule 12 extend horizontally to the plug-in slot 111 and the first wiring slot 112 respectively. The connection between the ferrule 12 and the first through slot 113 is an interference fit. The second insert cavity shell 13 is defined in the plug-in slot 111 outside the ferrule 12, and the end of the second insert cavity shell 13 far from the through slot extends horizontally to the outside of the plug-in slot 111. A ferrule groove 121 is defined on the wall of the end of the first housing 11 in the plug-in slot 111. The ferrule groove 121 in this embodiment is a circular groove structure opened along the peripheral direction of the outer wall of the ferrule 12, and in other embodiments, it can also be a semi-circular groove structure, as long as it does not affect its engagement with the bumps 221, it can also be a groove structure of other shapes.

A first crimping groove 123 is defined in the end of the ferrule 12 in the first wiring slot 112. The first crimping groove 123 has a concave structure as a whole, and a threaded hole is reserved on the first crimping groove 123 to fit a compression screw. The staff can screw and fix the core of the harness in the first crimping groove 123 by screwing the compression screw.

In this embodiment, the ferrule 12 is made of conductive metal material, and the ferrule 12 is a cylindrical structure as a whole. In other embodiments, the ferrule 12 may also be a long cylinder structure, as long as its insertion and connection with the inserting sleeve 22 is not affected.

A plastic insulating head 122 is defined on the end of the ferrule 12 in the plug-in slot 111. The plastic insulating head 122 is made of insulating plastic, and connection of the plastic insulating head 122 and the ferrule 12 is bonding or socketing. The plastic insulating head 122 can prevent the danger of accidental touch, it is able to protect operators.

The fixing sleeve 15 is threaded to a side area of the first insert cavity shell 14 away from the plug-in slot 111, and the fixing sleeve 15 is able to be closely connected with the rotating clamping structure 30. In this embodiment, the outer ring diameter of the fixing sleeve 15 is the same as that of the outer ring of the first housing 11. The inner side of the fixing sleeve 15 is provided with an internal thread, and the fixing sleeve 15 can be connected with the external thread distributed in the threaded connection area of the first insert cavity shell 14 through the internal thread. When the fixing sleeve 15 is connected to the threaded connection area of the first insert cavity shell 14, the end of the second positioning pin 34 in the third housing 31 in the clamping area of the first insert cavity shell 14 can be butted and fixed, so as to indirectly connect to the third housing 31 closely, so that the rotating clamping structure 30 is kept in a locked or separated state, and the occurrence of looseness can be avoided.

Figure 5:
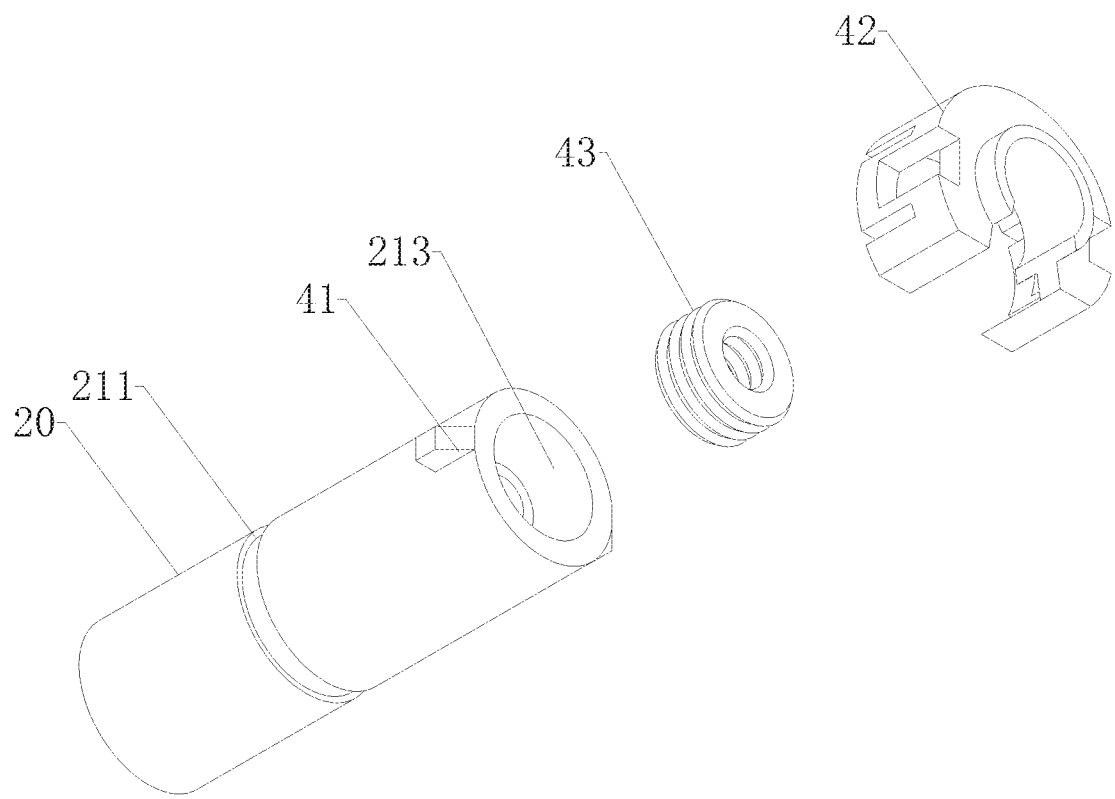
FIG. 5 is a local assembly stereo split diagram of the female connector of the connector for battery box of electric vehicle of FIG. 1.
Figure 6:
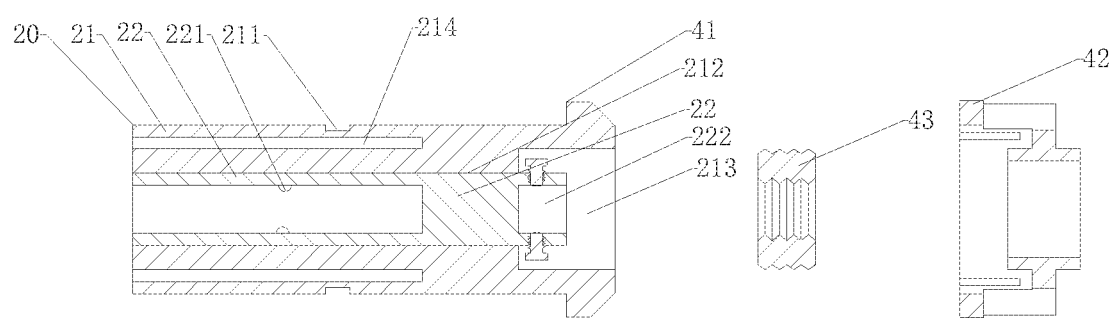
FIG. 6 is a partial assembly profile split diagram of the female connector of FIG. 5.

Referring to FIGS. 5 and 6, the female connector 20 is adapted to the male connector. The female connector 20 includes a second housing 21 and an inserting sleeve 22.

A second through slot 212 is defined in the end of the second housing 21, and a second wiring slot 213 is defined in the other end of the second housing 21. The section of the second housing 21 is a rectangular cylindrical shell. In other embodiments, the second housing 21 can also be a cylindrical shell with a rectangular section, as long as the stability of its structure is not affected, it can also be another shell structure. In the embodiment, the second housing 21 is made of thermoplastic engineering plastics, which can reduce the accident caused by electric leakage, reduce the weight of the body, and save the electric energy of the vehicle. At least one positioning slot 211 are defined in the second housing 21, the positioning slot 211 and the channels 141 are in the same radial direction. The positioning slot is substantially arcuate.

The inserting sleeve 22 is horizontally inserted and fixed in the second through slot 212, and the end of the inserting sleeve 22 close to the second wiring slot 213 extends horizontally into the second wiring slot 213. A shell groove 214 is defined in the second housing 21, and the shell groove 214 is located outside the second through slot 212 and coaxial. The end of the inserting sleeve 22 close to the second wiring slot 213 extends horizontally into the second wiring slot 213, and a second crimping groove 222 is defined in the end of the inserting sleeve 22 in the second wiring slot 213. The second crimping groove 222 is in a concave structure as a whole, and a threaded hole is reserved on the second crimping groove 222, and a compression screw can be inserted into the threaded hole. The staff can screw and fix the wire core of the wire harness placed in the second crimping groove 222 by screwing the compression screw.

The inserting sleeve 22 is made of wire metal material. In this embodiment, the inserting sleeve 22 is a sleeve body with one end opening two and a rectangular section. In other embodiments, it can also be a sleeve with a cylindrical structure, as long as it does not affect the plug-in coordination with the ferrule 12, it can also be another sleeve structure. In this embodiment, the inserting sleeve 22 is horizontally inserted and fixed in the second through slot 212. There is an interference fit between the inserting sleeve 22 and the second through slot 212.

At least two bumps 221 are defined in the inside wall of the inserting sleeve 22. The bumps 221 are able to be snap-fitted with the ferrule groove 121. The bumps 221 are annular convex structures in the inserting sleeve 22, when the male connector is mated with the female connector 20, the bumps 221 may correspond to the position of the ferrule groove 121. Through the concave-convex cooperation between the ferrule groove 121 and the bumps 221, it is convenient to fix the position of the ferrule 12 and the inserting sleeve 22 when they are fitted.

As a result, the male connector and the female connector 20 can be connected and conductive through the fitting insertion of the inserting sleeve 22 and the ferrule 12. The connection between the ferrule 12 and the inserting sleeve 22 is an interference fit.

Figure 7:
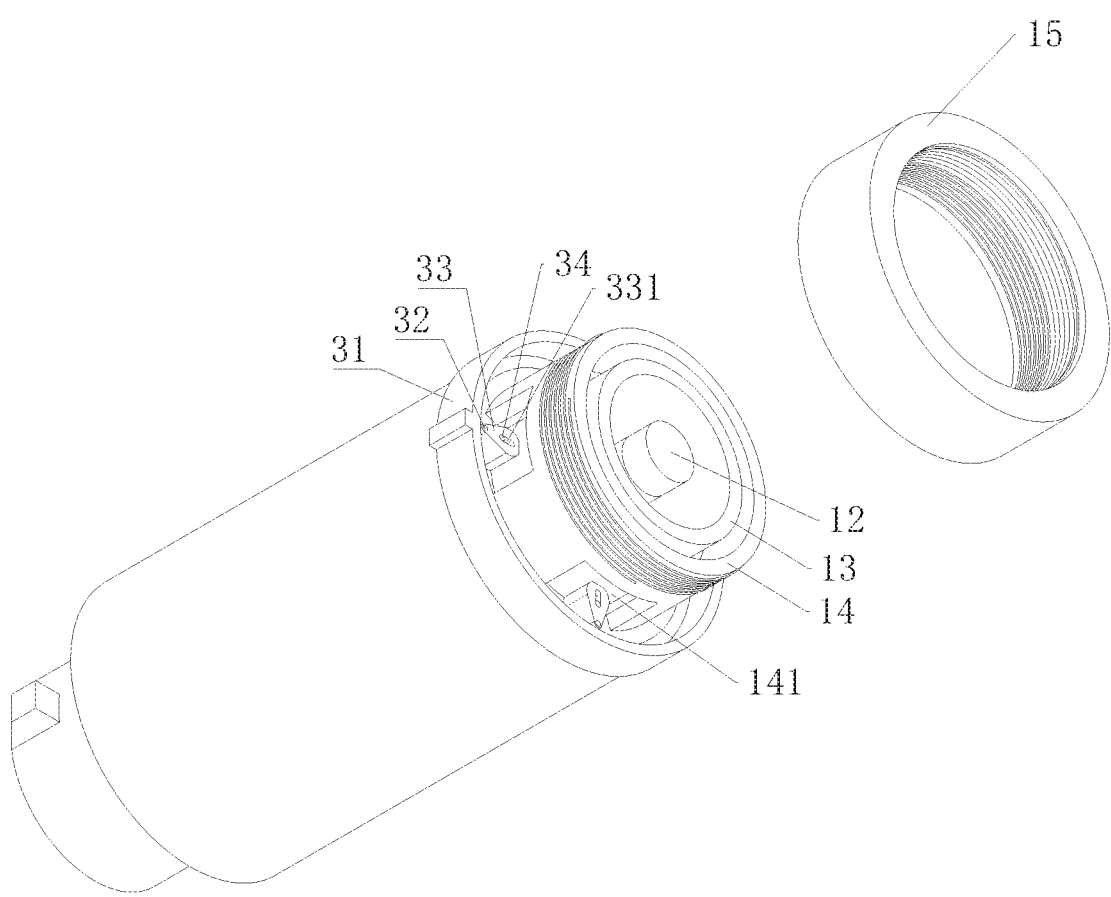
FIG. 7 is a local assembly stereo split diagram of the male connector of the connector for battery box of electric vehicle of FIG. 1 before rotation.

Referring to FIG. 7, the rotating clamping structure 30 includes a third housing 31, multiple first positioning pins 32, multiple stoppers 33 and multiple second positioning pins 34. The channels 141, the first positioning pins 32, the stoppers 33 and the second positioning pins 34 correspond one by one. The first positioning pins 32 and the second positioning pins 34 have the same axial direction.

The third housing 31 covers the connection of the first housing 11 and the second housing 21. The third housing 31 includes a first annular portion. One side of the annular portion turns to the form a second annular portion, and the end of the first positioning pins 32 are inserted and fixed on the second annular portion. The connection angle between the first annular portion and the second annular portion is a right angle. The first annular portion and the second annular portion are integrally punched.

Figure 8:
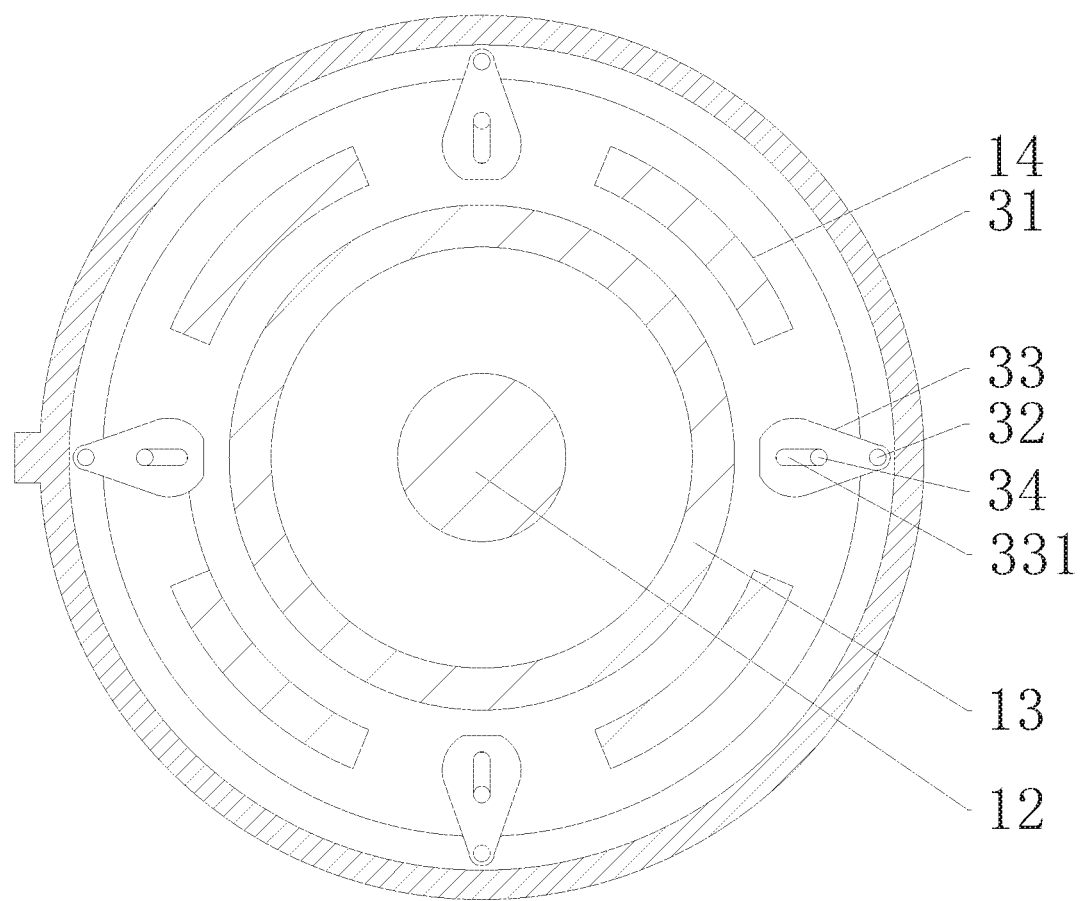
FIG. 8 is a partial profile diagram of the male connector of FIG. 7 before rotation.

Referring to FIG. 8, two positions of lock/open are defined in the third housing 31. The second annular portion can rotate relative to the first housing 11. A circle of limit chute is reserved on the first housing 11, and a limit slider which is connected with the limit chute is correspondingly arranged on the second annular portion. The limit chute and the limit slider are of circular structure as a whole.

The first positioning pins 32 are fixed in the third housing 31. In this embodiment, each of first positioning pin 32 is an axial body with a short axial structure as a whole. The number of the first positioning pins 32 correspond to the number of the stoppers 33. One end of each of first positioning pin 32 is inserted and fixed on one side of the second annular portion which is arranged in the first annular portion. The end of each of the stoppers 33 close to the third housing 31 is rotationally inserted with the first positioning pins 32.

Figure 9:
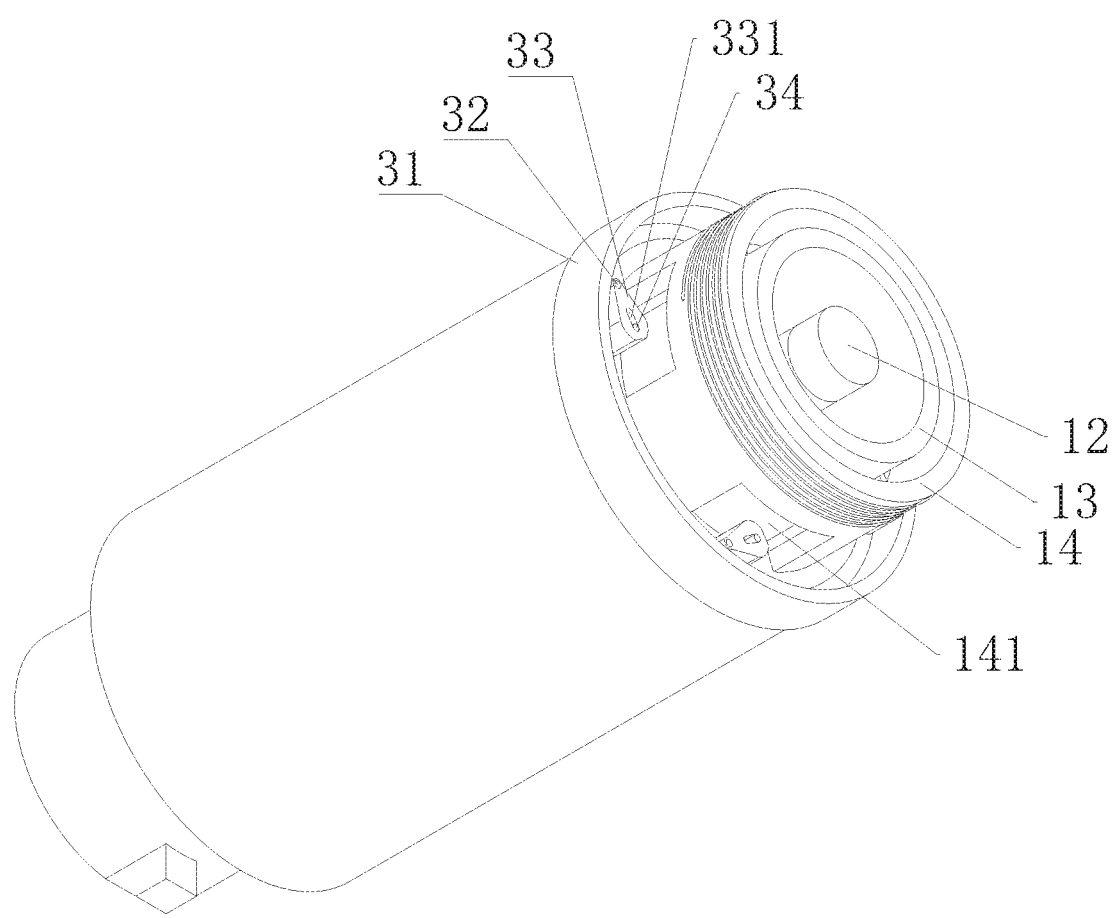
FIG. 9 is a local assembly stereo split diagram of the male connector of the connector for battery box of electric vehicle of FIG. 1 after rotation.

Referring to FIG. 9, one end of each of the stoppers 33 is a sharp angle end and the other end is an arc end. The sharp angle end is connected to the corresponding first positioning pin, and rotated to the third housing through one of the first positioning pins. the arc end is able to run into or out of the corresponding channel 141 to fit the positioning slot 211. A chute 331 is defined in the middle part of each of the stoppers 33 and the chute 331 is in the corresponding channel 141. The chute 331 is in the shape of a runway as a whole, and is arranged in the channels 141 as a whole. The middle part of each of the stoppers 33 is able to move on the corresponding channel 141.

In this embodiment, the stopper 33 is cam shaped as a whole, but in other embodiments, the stoppers 33 can also be a pillar with a thick rod shape as a whole. As long as the adaptability between the stoppers 33 and the positioning slot 211 is ensured, the stoppers 33 can also be of other structures. The included angle end of each of the stoppers 33 is connected with the first positioning pins 32.

Figure 10:
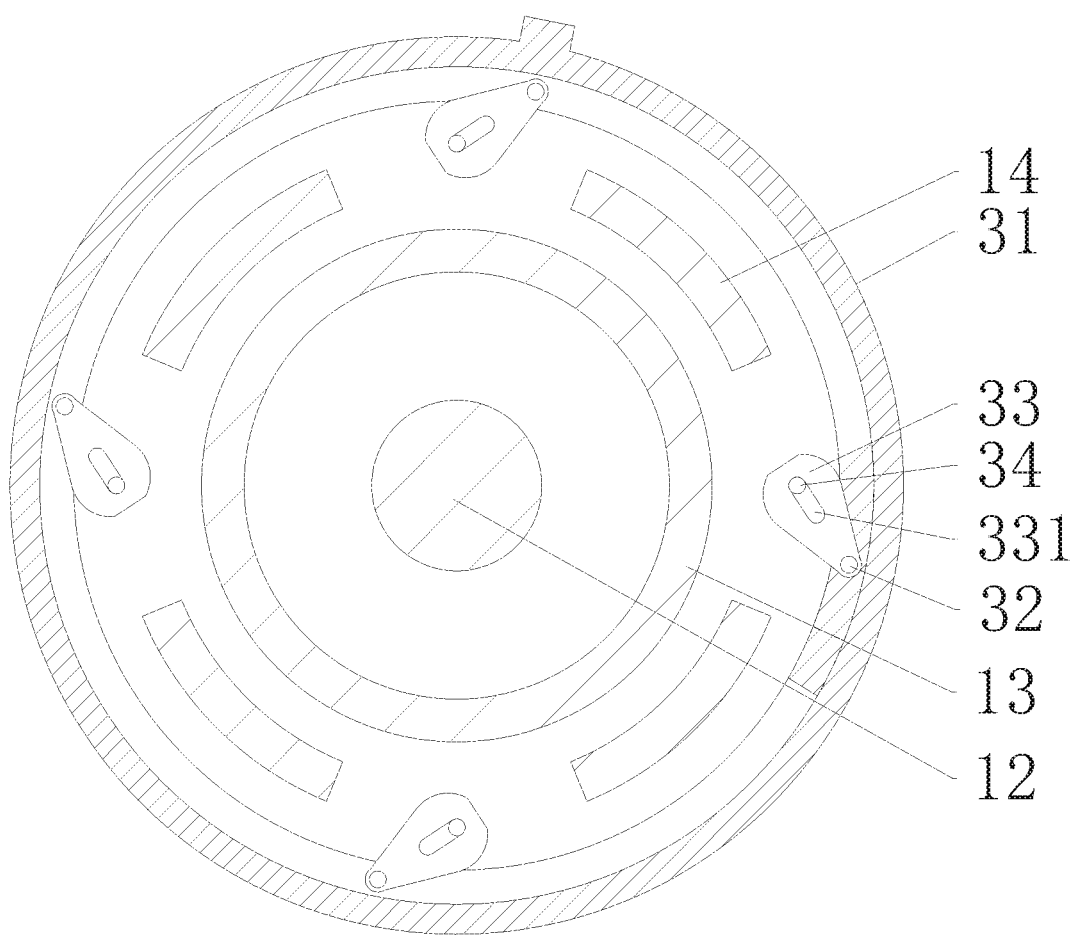
FIG. 10 is a partial profile diagram of the male connector of FIG. 9 after rotation.

Referring to FIG. 10, each of the second positioning pins 34 can glide in the corresponding chute 331 and is fixed in the corresponding channel 141. In this embodiment, each of second positioning pin 34 has a shaft body with a short-axis structure as a whole. Each of second positioning pin 34 is fixed on the male connector, and each of second positioning pin 34 slides through the corresponding chute 331. Each of second positioning pin 34 is fixed on the first housing 11. Each of second positioning pin 34 is vertically inserted into the corresponding channel 141, and the middle of each of second positioning pin 34 passes through the corresponding chute 331. Each of second positioning pin 34 can guide and limit the movement of the corresponding stopper.

The sharp angle end is able to rotate axially around the corresponding first positioning pin 32 under the guidance of the corresponding second positioning pin to make the corresponding arc end screw into or out of the corresponding positioning slot 211, so as to realize the locking or separation of the male connector and the female connector 20. When the third housing 31 rotates in one direction, the arc end can be screwed into the corresponding channel 141 and then stuck into the positioning slot 211, so as to realize the locking of the male connector 10 and the female connector 20. When the third housing rotates in another direction, the arc end can be screwed out of the corresponding channel 141 and the positioning slot 211, so as to realize the separation of the male connector 10 and the female connector 20.

Therefore, the working mode of the rotating clamping structure 30 as follows: two positions of locking/opening are provided for the third housing 31, the stoppers 33 are connected to the third housing 31 by the first positioning pins 32, and the second positioning pin 34 s 34 are fixed in the blocking member through the channels 141. When the third housing 31 rotates, the stoppers 33 are driven to rotate around the first positioning pins 32, so that the second positioning pin 34 s 34 are limited to slide in the chute 331. When the third housing 31 is turned to the lock position, each of the stoppers 33 just inserts the arc end into the corresponding positioning slot 211, and the arc end is tightly connected to the slot wall of the corresponding positioning slot 211, so that the first housing 11 and the second housing 21 are fixed to each of other to lock the male connector and the female connector 20 together. When the third housing 31 is turned to the open position, the arc end is disengaged from the corresponding positioning slot 211, the male connector and the female connector 20 are separated.

It is worth mentioning that the male connector and the female connector 20 can be fixed at any position, that is: the male connector and the female connector 20 are inserted together at any position, only need to be rotated by hand after the third housing 31 turns each of the stoppers 33 into the corresponding positioning slot 211 to its rotation direction, locking and fixing can be completed, which is convenient and practical.

Each of the waterproof structures 40 includes at least two tabs 41, a positioning sleeve 42 positioned by the tabs 41 and an expansion rubber plug 43.

The tabs 41 are circularly defined at the outer edge of the tail of the male connector or the outer edge of the tail of the female connector 20. The tabs 41 are inclined towards the tail direction and folded to form a hook part, and the vertical section of the hook part is a right-angle trapezoid. The tabs 41 can be integrally formed by stamping with the first housing 11 or the second housing 21.

The positioning sleeve 42 is a sleeve body made of thermoplastic engineering plastic and has a circular shape as a whole. In other embodiments, the positioning sleeve 42 can also be a sleeve body with a square shape as long as it matches the tail of the protective shell. At least two clamping grooves are defined on the peripheral side of the positioning sleeve 42, and at least two first openings are defined on the side wall of the positioning sleeve 42. The tabs 41 are located in the clamping grooves though the first openings. The tabs 41 on the male connector and the female connector 20 are respectively inclined and gathered toward their tails to form a hook portion, and the vertical cross section of the hook portion has a right-angle trapezoid shape. The positioning sleeve 42 has at least one second openings on one side, which can facilitate the penetration of the wire harness, and facilitate operations such as installation, disassembly and replacement.

The expansion rubber plug 43 is accommodated in the cavity of the first wiring slot 112. The expansion rubber plug 43 is a rubber sleeve with a ring. The expansion rubber plug 43 can expand with water to fill the entire tail of the terminal to prevent water from entering, for playing a waterproof function.

The rotating clamping structure 30 of the connector of the invention can realize the quick locking or separation of the male connector and the female connector 20, making the connection of the connector more stable, and can be fixed at any position of the connector, which is convenient and practical. The invention can facilitate the quick installation and disassembly of the connector harness by the tabs 41 and the positioning sleeve 42 in the waterproof structures 40. The expansion rubber plug 43, the connector protective shell and the harness protective skin are connected together by welding or bonding, which is effective Improved waterproof performance. And both the first housing 11 and the second housing 21 use thermoplastic engineering plastics to reduce accidents caused by electric leakage and reduce the weight of the car body, thereby saving vehicle electrical energy. The concave-convex connector part of the connector of the invention adopts a cylindrical body contact, which makes the contact area larger, the connection more stable, and can transmit the high-voltage, large-current electric energy output from the battery box.

Specifically, the sharp angle end can rotate around the axial direction of the first positioning pin 32 to make the arc end screw into or out of the positioning slot 211, so as to realize the locking or separation of the male connector and the female connector 20. During the positioning process, the male connector and the female connector 20 will never fall off each of other, and can be installed and positioned at any position. This is very labor-saving and the operation is relatively simple. The connector can meet the working requirements of the battery box of the electric vehicle under various environmental conditions, and ensure the continuous power supply of the battery in the battery box, which is safe and reliable.

Second Embodiment

A battery box is shown as an embodiment, the battery box includes at least one connector, and the connector is the connector for battery box of electric vehicle in the first embodiment. The battery box is the battery box of the electric vehicle, which can be used to store the charging battery of the electric vehicle. The plug-in part between the batteries in the battery box adopts the connector. In this way, the connection between batteries is more reliable, and it is also convenient to install and remove batteries, so as to avoid open circuit between batteries.

Third Embodiment

An electric vehicle is shown as an embodiment, the electric vehicle includes at least one battery box. The battery box in this embodiment can be the battery box in the second embodiment. The electric vehicle can be driven in various environments through the stable connection of the connectors. Its performance is more superior, and it can meet the safety and reliability requirements of high voltage, high current, water resistance, portability, etc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector for battery box of electric vehicle, comprising:
a male connector, comprising a first housing; multiple channels being defined in the first housing and arranged coaxial;
a female connector, comprising a second housing; at least one positioning slot being defined in the second housing; and
a rotating clamping structure, comprising a third housing, a plurality of first positioning pins, a plurality of stoppers and a plurality of second positioning pins; one end of each of the stoppers being a sharp angle end and the other end being an arc end; the sharp angle end being rotated to the third housing through one of the first positioning pins; the first positioning pins and the second positioning pins having the same axial direction;
wherein, the male connector is adapted to the female connector, and the third housing covers the connection of the first housing and the second housing; the positioning slot and the channels are connected in the same radial direction; the channels, the first positioning pins, the stoppers and the second positioning pins correspond one by one; a chute is defined in each of the stoppers, and each of the second positioning pins can glide in the corresponding chute and is fixed in the corresponding channel; when the third housing rotates in one direction, the arc end can be screwed into the corresponding channel and then stuck into the positioning slot, so as to realize the locking of the male connector and the female connector; when the third housing rotates in another direction, the arc end can be screwed out of the corresponding channel and the positioning slot, so as to realize the separation of the male connector and the female connector.

2. The connector according to claim 1, wherein the connector further comprises two waterproof structures; each of the waterproof structure comprises at least two tabs and a positioning sleeve positioned by the tabs; the tabs are circularly defined at the outer edge of the tail of the male connector or the outer edge of the tail of the female connector.

3. The connector according to claim 2, wherein the tabs are inclined towards the tail direction and folded to form a hook part, and the vertical section of the hook part is a right-angle trapezoid.

4. The connector according to claim 3, wherein at least two clamping grooves are defined on the peripheral side of the positioning sleeve, and at least two first openings are defined on the side wall of the positioning sleeve; the tabs are located in the clamping grooves though the first openings.

5. The connector according to claim 1, wherein a first insert cavity shell are defined in the end of the first housing which connects to the second housing, and the channels are defined in the first insert cavity shell.

6. The connector according to claim 1, wherein the positioning slot is substantially arcuate.

7. The connector according to claim 1, wherein each of the stoppers is cam shaped as a whole.

8. The connector according to claim 5, wherein a plug-in slot is defined in the end of the first housing close to the second housing; a first wiring slot is defined in the end of the first housing far away from the plug-in slot; a first through slot is defined in the first housing between the plug-in slot and the first wiring slot.

9. The connector according to claim 8, wherein the male connector further comprises a ferrule; the ferrule is horizontally inserted and fixed in the first through slot, and the two ends of the ferrule extend horizontally to the plug-in slot and the first wiring slot respectively.

10. The connector according to claim 9, wherein a second insert cavity shell is defined in the end of the first housing which connects to the second housing, and the outer diameter of second insert cavity is less than the inner diameter of the first insert cavity shell; the second insert cavity shell is defined in the plug-in slot outside the ferrule, and the end of the second insert cavity shell far from the first through slot extends horizontally to the outside of the plug-in slot.

11. The connector according to claim 5, wherein the male connector further comprises a fixing sleeve; the fixing sleeve is threaded to a side area of the first insert cavity shell away from the plug-in slot, and the fixing sleeve is able to be closely connected with the rotating clamping structure.

12. The connector according to claim 10, wherein a ferrule groove is defined on the wall of the end of the first housing in the plug-in slot; a plastic insulating head is defined on the end of the ferrule in the plug-in slot; a first crimping groove is defined in the end of the ferrule in the first wiring slot.

13. The connector according to claim 1, wherein a second through slot is defined in the end of the second housing, and a second wiring slot is defined in the other end of the second housing.

14. The connector according to claim 13, wherein the female connector further comprises an inserting sleeve; the inserting sleeve is horizontally inserted and fixed in the second through slot, and the end of the inserting sleeve close to the second wiring slot extends horizontally into the second wiring slot; a shell groove is defined in the second housing, and the shell groove is located outside the second through slot and coaxial.

15. The connector according to claim 14, wherein at least two bumps are defined in the inside wall of the inserting sleeve; the end of the inserting sleeve close to the second wiring slot extends horizontally into the second wiring slot, and a second crimping groove is defined in the end of the inserting sleeve in the second wiring slot.

16. The connector according to claim 1, wherein the third housing comprises a first annular portion; one side of the annular portion turns to the form a second annular portion, and the end of the first positioning pins are inserted and fixed on the second annular portion.

17. The connector according to claim 2, wherein a second opening is defined in the side of the positioning sleeve.

18. The connector according to claim 8, wherein each of the waterproof structures further comprises an expansion rubber plug; the expansion rubber plug is accommodated in the cavity of the first wiring slot.

19. A battery box, comprising at least one connector; the connector comprising:
a male connector which comprising a first housing; a plurality of channels being defined in the first housing and arranged coaxial;
a female connector which comprising a second housing; at least one positioning slot being defined in the second housing; and
a rotating clamping structure, which comprising a third housing, a plurality of first positioning pins, a plurality of stoppers and a plurality of second positioning pins;

one end of each of the stoppers being a sharp angle end and the other end being an arc end; the sharp angle end being rotated to the third housing through one of the first positioning pins; the first positioning pins and the second positioning pins having the same axial direction;

wherein, the male connector is adapted to the female connector, and the third housing covers the connection of the first housing and the second housing; the positioning slot and the channels are connected in the same radial direction; the channels, the first positioning pins, the stoppers and the second positioning pins correspond one by one; a chute is defined in each of the stoppers, and each of the second positioning pins can glide in the corresponding chute and is fixed in the corresponding channel; when the third housing rotates in one direction, the arc end can be screwed into the corresponding channel and then stuck into the positioning slot, so as to realize the locking of the male connector and the female connector; when the third housing rotates in another direction, the arc end can be screwed out of the corresponding channel and the positioning slot, so as to realize the separation of the male connector and the female connector.

20. An electric vehicle, the battery box of the electric vehicle comprising at least one connector; the connector comprising:
a male connector which comprising a first housing; a plurality of channels being defined in the first housing and arranged coaxial;
a female connector which comprising a second housing; at least one positioning slot being defined in the second housing; and
a rotating clamping structure, which comprising a third housing, a plurality of first positioning pins, a plurality of stoppers and a plurality of second positioning pins; one end of each of the stoppers being a sharp angle end and the other end being an arc end; the sharp angle end being rotated to the third housing through one of the first positioning pins; the first positioning pins and the second positioning pins having the same axial direction;

wherein, the male connector is adapted to the female connector, and the third housing covers the connection of the first housing and the second housing; the positioning slot and the channels are connected in the same radial direction; the channels, the first positioning pins, the stoppers and the second positioning pins correspond one by one; a chute is defined in each of the stoppers, and each of the second positioning pins can glide in the corresponding chute and is fixed in the corresponding channel; when the third housing rotates in one direction, the arc end can be screwed into the corresponding channel and then stuck into the positioning slot, so as to realize the locking of the male connector and the female connector; when the third housing rotates in another direction, the arc end can be screwed out of the corresponding channel and the positioning slot, so as to realize the separation of the male connector and the female connector.

* * * * *